US012450013B1

(12) United States Patent
Dubey

(10) Patent No.: US 12,450,013 B1
(45) Date of Patent: Oct. 21, 2025

(54) EXTERNAL STORAGE DEVICE SUPPORTED HOST RAM EXPANSION

(71) Applicant: Sandisk Technologies, Inc., Milpitas, CA (US)

(72) Inventor: Sankalp Dubey, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/643,816

(22) Filed: Apr. 23, 2024

(51) Int. Cl.
*G06F 3/06* (2006.01)

(52) U.S. Cl.
CPC ............ *G06F 3/0659* (2013.01); *G06F 3/061* (2013.01); *G06F 3/068* (2013.01)

(58) Field of Classification Search
CPC ......... G06F 3/0659; G06F 3/061; G06F 3/068
USPC .................................................. 711/154, 100
See application file for complete search history.

(56) References Cited

U.S. PATENT DOCUMENTS

| | | | |
|---|---|---|---|
| 7,464,240 B2 | 12/2008 | Caulkins et al. | |
| 10,437,499 B2 | 10/2019 | Lee et al. | |
| 10,846,017 B2 | 11/2020 | Agarwal | |
| 11,646,068 B2 | 5/2023 | Kim et al. | |
| 11,656,994 B2 | 5/2023 | Hahn et al. | |
| 11,681,634 B2 | 6/2023 | Benisty et al. | |
| 2009/0235038 A1 | 9/2009 | Sartore | |
| 2015/0261446 A1 | 9/2015 | Lee | |
| 2023/0409205 A1* | 12/2023 | Shallal | G06F 12/0802 |

OTHER PUBLICATIONS

NVM Express, "NVMe over PCIe Transport Specification," Rev. 1.0d, Dec. 27, 2023, 37 pages.
NVM Express, "Base Specification," Rev. 2.0d, Jan. 11, 2024, 466 pages.
SD Association, "SD Express Memory Cards with PCIe and NVMe Interfaces," White Paper, Jun. 2020, 10 pages.
SD Association, "SD Express (SD7.x)—Host Implementation Guideline," Design Guide, May 2020, 21 pages.

* cited by examiner

*Primary Examiner* — Hosain T Alam
*Assistant Examiner* — Zubair Ahmed
(74) *Attorney, Agent, or Firm* — Pearl Cohen Zedek Latzer Baratz LLP

(57) ABSTRACT

Technology for a hybrid memory system that allows host access both non-volatile storage and volatile memory (e.g., RAM). The hybrid memory system may send a command to the host requesting that the host select a mode of access that may include a first mode in which the host has access to only the volatile memory and a second mode in which the host has access to at least the non-volatile storage. While in a mode in which the host has access to the volatile memory, the hybrid memory system may analyze data packets received from the host to determine whether a data packet is a request to access the volatile memory or the non-volatile storage. Responsive to a determination that the host is seeking access to the volatile memory the hybrid memory system converts the packet from the host to a packet suitable to access the volatile memory.

20 Claims, 12 Drawing Sheets

Figure 8    800 ic devices such as cellular telephones, digital cameras, personal digital assistants, medical electronics, mobile computing devices, servers, solid state drives, non-mobile computing devices and other devices. Semiconductor memory may comprise non-volatile memory (also referred to as "non-volatile storage") or volatile memory. Non-volatile storage enables information to be stored and retained even while the non-volatile storage is not connected to a source of power (e.g., a battery). An example of non-volatile storage is flash storage. Common types of flash storage include NAND and NOR.

EXTERNAL STORAGE DEVICE SUPPORTED HOST RAM EXPANSION

BACKGROUND

The present disclosure relates to semiconductor memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory (also referred to as "non-volatile storage") or volatile memory. Non-volatile storage enables information to be stored and retained even while the non-volatile storage is not connected to a source of power (e.g., a battery). An example of non-volatile storage is flash storage. Common types of flash storage include NAND and NOR.

Many electronic devices make use of embedded or connected storage systems that include non-volatile storage. An electronic device that includes an embedded storage system, or is connected to a storage system, is often referred to as a host. Data stored in the embedded or connected storage system can be transferred to the host for use by the host with various applications. For example, a storage system may store a data structure in non-volatile storage that is used by an application on the host to perform any number of tasks.

The host may have some amount of volatile memory such as Dynamic Random Access Memory (DRAM), Static Random Access Memory (SRAM), or the like. This volatile memory is commonly referred to as Random Access Memory (RAM). However, for many electronic devices the amount of RAM is quite limited, especially in view of RAM requirements of software applications. For example, electronic devices such as cell phones, tablets, and even some laptops may have very limited amount of RAM. Also, electronic devices that a have sufficient amount of RAM when first sold oftentimes need a greater amount of RAM within a few years to be able to run newer software applications and operating system (O/S) updates.

One technique for providing more RAM to an electronic device is to make some of the non-volatile storage in an attached storage system available to the host as what may be referred to as "virtual RAM." However, virtual RAM is very slow relative to actual RAM due to the much higher latency of non-volatile storage. Also, time is required to map between virtual addresses in the host address space and the physical addresses in the storage system. Furthermore, non-volatile storage such as NAND flash has a limited number of program/erase cycles and thus is not suitable for sustained use as virtual RAM.

Another technique for providing additional RAM to an electronic device is for the electronic device to have a memory socket or RAM slot that enables a RAM module (e.g., memory chip) to be added to the electronic device. However, such memory sockets are typically quite large and thus usually only available in laptop computers and desktop computers due to size constraints.

BRIEF DESCRIPTION OF THE DRAWINGS

Like-numbered elements refer to common components in the different figures.

DETAILED DESCRIPTION

Technology is disclosed herein for a hybrid memory system that allows (or permits) a host to access both non-volatile storage and volatile memory (e.g., RAM). In an embodiment, the hybrid memory system sends a command to the host requesting that the host select a mode of access that may include a first mode in which the host has access to only the volatile memory, a second mode in which the host has access to both the volatile memory and the non-volatile storage, and a third mode in which the host has access to the non-volatile storage but not the volatile memory. While in a mode in which the host has access to the volatile memory, the hybrid memory system may analyze data packets received from the host to determine whether the data packet is a request to access the volatile memory or the non-volatile storage. Responsive to a determination that the host is seeking access to the volatile memory the hybrid memory system converts the packet from the host to a packet suitable to access the volatile memory. In one embodiment, the hybrid memory system has a protocol manager and a protocol converter that work together to switch and manage Peripheral Component Interconnect Express (PCIe®) transactions used over an interface between the host and the hybrid memory system and DDR (Double Data Rate) transactions used to interface with the volatile memory.

Figure 1:
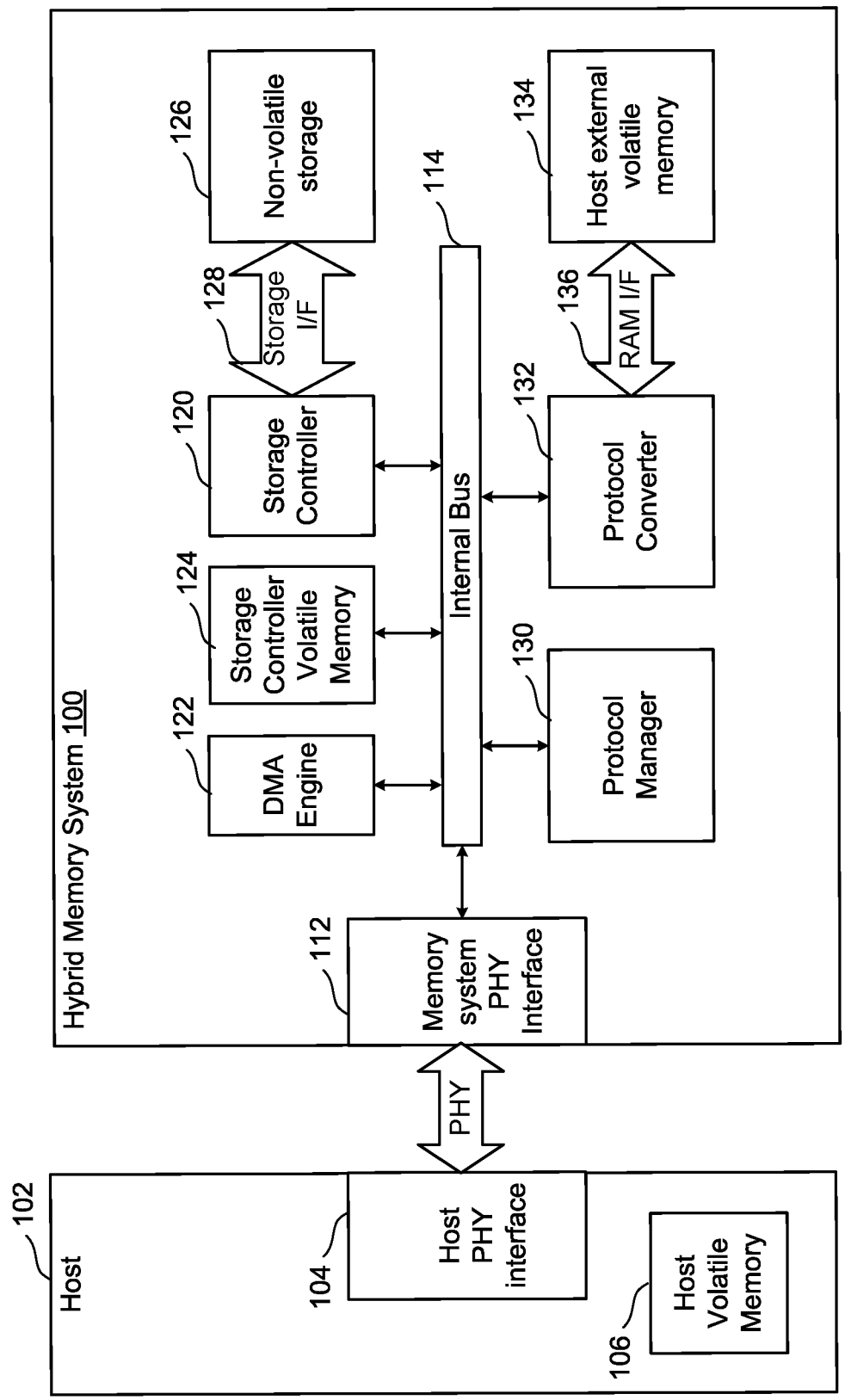
FIG. 1 is a block diagram depicting one embodiment of a hybrid memory system connected to a host.

FIG. 1 is a block diagram of one embodiment of a hybrid memory system 100 that implements the technology described herein. The hybrid memory system 100 is connected to a host 102. The hybrid memory system 100 has non-volatile storage 126, which may be flash storage but is not limited to flash. The hybrid memory system 100 has host external volatile memory (e.g., RAM) 134. The hybrid memory system 100 can be configured to provide the host 102 with access to the host external RAM 134 and/or the non-volatile storage 126. In one embodiment, hybrid memory system 100 is a hybrid memory card. A hybrid memory card, as the term is used herein, is able to provide host access to both non-volatile storage (e.g., flash storage) and to volatile memory (e.g., RAM). In an embodiment, the hybrid memory system 100 is a hybrid Secure Digital (SD) memory card that allows (or permits) a host access to both flash storage and RAM. However, hybrid memory system 100 can be a hybrid microSD memory card, hybrid Multi-Media card (MMC), hybrid Compact Flash® (CF) card, hybrid Memory Stick® (MS), hybrid Universal Serial Bus (USB) drive, a hybrid solid state drive ("SSD") or other type of hybrid memory system that allow a host access to both non-volatile storage (e.g., flash storage) and volatile memory (e.g., RAM). The proposed technology is not limited to any one type of memory system.

Hybrid memory system 100 may be connected to host 102, which can be a computer, server, electronic device (e.g., smart phone, tablet or other mobile device), appliance, or another apparatus that uses memory and has data processing capabilities. In some embodiments, host 102 is separate from, but connected to, hybrid memory system 100. In other embodiments, hybrid memory system 100 is embedded within host 102. The host 102 has a host physical communication interface (PHY interface) 104 that enables the hybrid memory system 100 to physically connect to the host 102. The PHY interface 104 provides a physical interface and an electrical interface. The PHY interface 104 may also handle the lowest level functions of a protocol stack. The host physical (PHY) interface 104 may include a memory card slot, a Peripheral Component Interconnect Express (PCIe®) slot, an SD slot, a micro-SD slot, a PCMCIA (Personal Computer Memory Card International Association) card slot (also referred to as PC card slot), USB port, or any other type of physical interface for hybrid memory system 100. In an embodiment, the PHY interface 104 implements the physical layer (PHY) of the PCIe® protocol.

The host 102 has a host volatile memory 106 (e.g., RAM, SRAM, DRAM, Low Power Double Data Rate (LPDDR) RAM). For many hosts 102 the amount of host volatile memory 106 is limited in size. The hybrid memory system 100 provides for expansion of the amount of usable volatile memory by providing access to host external volatile memory 134 on the hybrid memory system 100. The host external volatile memory 134 may also be referred to herein as host external RAM 134.

Hybrid memory system 100 comprises a physical (PHY) interface 112 that is connectable to host 102 to communication with host 102. The PHY interface 112 provides a physical and electrical connection to the host PHY interface 104. In one embodiment, PHY interface 112 comprises a Peripheral Component Interconnect Express (PCIe®) interface. The PHY interface 112 may also handle at least some of the functions of a protocol stack. In embodiment, the PHY interface 104 implements the physical layer (PHY) of the PCIe® protocol. The PHY interface 112 may be able to implement more than one type of physical interface. In one embodiment, the PHY interface 112 is also able to implement a Secure Digital® (SD) interface. Other interfaces can also be used, such as SCSI (Small Computer System Interface), SATA (Serial Advanced Technology Attachment), etc.

PHY interface 112 is also connected to an internal bus 114. In one embodiment, the internal bus 114 is replaced with a network-on-chip (NOC). However, a NOC is not required. Connected to and in communication with internal bus 114 is storage controller 120, DMA (Direct Memory Access) engine 122, storage controller volatile memory 124, storage interface (I/F) 128, protocol manager 130, protocol converter 132, host external RAM 134, and RAM interface 136.

The host external RAM 134 may be Random Access Memory (RAM), Static Random Access Memory (SRAM), Dynamic Random Access Memory (DRAM), Double Data Rate Synchronous Dynamic Random Access Memory (DDR SDRAM), Low-power Double Data Rate (LPDDR), etc. The hybrid memory system 100 has a mode that allows the host 102 to access (e.g., read, write) the host external RAM 134. In one embodiment, the hybrid memory system 100 has a first mode that allows host access to the host external RAM 134 but not to the non-volatile storage 126, a second mode that allows host access to the host external RAM 134 and also to the non-volatile storage 126, and a third mode that allows host access to the non-volatile storage 126 but not to the host external RAM 134. In an embodiment, the host external RAM 134 is accessible by the host 102, but is not accessible by the storage controller 120. In an embodiment, the host external RAM 134 is on a separate memory chip from the memory chip that contains the storage controller volatile memory 124.

In an embodiment, the hybrid memory system 100 is initialized when the hybrid memory system 100 is connected to the host 102. Furthermore, system settings of the host 102 may show the option to enable only the host external RAM 134, only the non-volatile storage 126, or both the host external RAM 134 and the non-volatile storage 126. In response to the host requesting access to at least the external RAM 134, the hybrid memory system 100 enables the host external RAM 134 for dynamic random-access transactions. The hybrid memory system 100 may also enable non-volatile storage 126 for host access transactions. In an embodiment, the host external RAM 134 is not accessible by the storage controller 120.

The RAM interface 136 is used to communicate between the protocol converter 132 and the host external RAM 134. In one embodiment, the RAM interface 136 provides a DDR interface. Other interfaces can also be used. The PHY interface 112 and the RAM interface 136 use different protocols. In one embodiment, the PHY interface includes a PCIe® interface and the RAM interface includes a DDR interface. The protocol converter 132 converts between these two protocols. In an embodiment, the protocol manager 130 and protocol converter 132 work together to switch and manage PCIe® protocol data transactions and DDR protocol data transactions.

The protocol manager 130 analyzes data packets received from the host 102 over the PHY interface 112. In an embodiment, the protocol manager 130 determines whether the packet is a request to access the host extended RAM 134 or the non-volatile storage 126. Responsive to the packet being a request to access the host external RAM 134 the protocol manager 130 sends to packet to the protocol converter 132. The protocol converter 132 validates and parses data received from protocol manager 130. The protocol converter 132 convert the packets of the first protocol (e.g., PCIe® protocol) to packets of the second protocol (e.g., DDR protocol). The protocol converter 132 then sends the packets of the second protocol to the host external RAM 134 to access the host external RAM 134. In one embodiment, the protocol manager 130 analyzes Transaction Layer Protocol (TLP) packets of the PCIe® protocol and converts the TLP packets to DDR protocol packets.

The storage controller 120 performs memory operations, such as programming, erasing, reading, and memory management processes with respect to the non-volatile storage 126. The storage controller volatile memory (e.g., e.g., DRAM, SRAM) 124 is used by the storage controller 120 for purposes of accessing and managing the non-volatile storage 126. For example, storage controller volatile memory 124 may store logical to physical address translation tables ("L2P tables"). Storage interface 128 communicates with non-volatile storage 126. In one embodiment, storage interface 128 provides a Toggle Mode interface. Other interfaces can also be used.

In many systems, the non-volatile storage 126 is addressed internally to the hybrid memory system using physical addresses associated with one or more memory die in non-volatile storage 126. However, the host system 102 will use logical addresses to address the various memory locations. This enables the host 102 to assign data to consecutive logical addresses, while the hybrid memory system 100 is free to store the data as it wishes among the locations of the one or more memory die. To implement this system, storage controller 120 (e.g., the translation module) performs address translation between the logical addresses used by the host and the physical addresses used by the memory die. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the volatile memory 124 cannot hold all of the L2P tables. In such a case, the entire set of L2P tables are stored in non-volatile storage 126 and a subset of the L2P tables are cached (L2P cache) in the volatile memory 124. In one embodiment, the storage controller 120 uses Non-Volatile Memory Express (NVMe®) over Peripheral Component Interconnect Express (PCIe®) to provide host access to the non-volatile storage 126.

The components of hybrid memory system 100 depicted in FIG. 1 are electrical circuits. The DMA engine 122, storage controller 120, protocol manager 130, and protocol converter 132 may each be implemented with hardware, software, or a combination of hardware and software. In one embodiment, the hybrid memory system 100 has a processor 156 that performs various functions of the storage controller 120, protocol manager 130, and/or protocol converter 132. The processor may be programmed with processor executable instructions to implement some or all of the functions of storage controller 120, protocol manager 130, and/or protocol converter 132.

In one embodiment, non-volatile storage 126 comprises one or more memory dies. Commands and data are transferred between storage controller 120 and memory die in non-volatile storage 126 via storage interface 128. Each memory die may contain one or more memory structures. In one embodiment, the memory structures comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers. In another embodiment, the memory structures comprise a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in non-volatile storage 126 is not limited to the examples above. Many different types of memory array architectures or memory technologies can be used within non-volatile storage 126. No particular non-volatile storage technology is required for purposes of the new claimed embodiments proposed herein. Other examples of suitable technologies for memory cells in the non-volatile storage 126 include ReRAM memories (resistive random access memories), magnetoresistive memory (e.g., MRAM, Spin Transfer Torque MRAM, Spin Orbit Torque MRAM), FeRAM (ferroelectric RAM), phase change memory (e.g., PCM), and the like. Examples of suitable technologies for memory cell architectures of the non-volatile storage 126 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

For purposes of this document, the phrases "a control circuit" or "one or more control circuits" can include, but is not limited to, any one of or any combination of protocol manager 130, protocol converter 132, DMA engine 122, storage controller 120, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, Field-Programmable Gate Array (FPGA), Application Specific Integrated Circuit (ASIC), integrated circuit, or other type of circuit.

Figure 2:
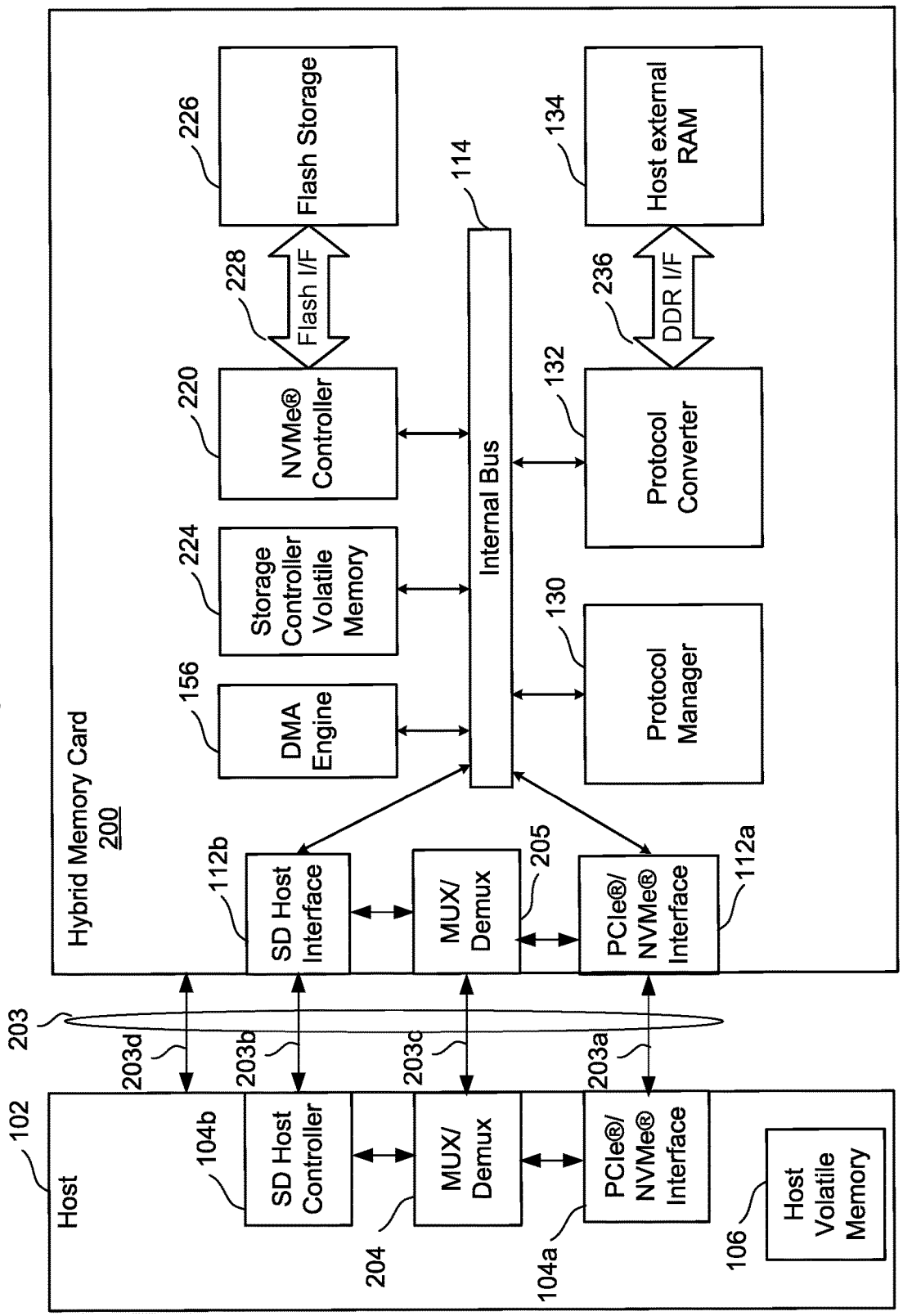
FIG. 2 is a block diagram of one embodiment of a hybrid memory card that may implement the hybrid memory system of FIG. 1.

In an embodiment, the hybrid memory system 100 includes a hybrid memory card. FIG. 2 is a block diagram of one embodiment of a hybrid memory card 200 that may implement the hybrid memory system of FIG. 1. The memory card is a hybrid memory card that provides options to allow host access to flash storage and/or to volatile memory (e.g., RAM). In an embodiment, the hybrid memory 200 is a hybrid Secure Digital (SD) memory card that provides flash storage access and/or RAM access to a host 102. However, hybrid memory card 200 can be a hybrid microSD memory card, hybrid MultiMedia card (MMC), hybrid Compact Flash (CF) card, hybrid Memory Stick (MS) or other type of hybrid memory card that provides host access to non-volatile storage (e.g., flash storage) and/or to volatile memory (e.g., RAM).

The hybrid memory card 200 and the host 102 may communicate over a PCIe®/NVMe® interface 112a and an SD interface 112b. A PCIe®/NVMe® interface 112a is an interface configured to implement an NVMe® protocol over a PCIe® interface. The interface between the host 102 and hybrid memory card 200 includes a number of electrical pathways 203. The electrical pathways 203 include a first set of pads, pins or the like on the hybrid memory card 200 and a second set of pads, pins or the like on the host 102. The host 102 may have a PCIe® Express slot, an SD slot, a micro-SD slot, or other type of slot that forms a part of the electrical pathways 203. The electrical pathways 203 are for providing power, data, clock, commands, etc. The PCIe® interface 112a and the SD interface 112b may share some of the electrical pathways 203c such as data lines. The hybrid memory card 200 has a MUX/DeMUX (multiplexer/demultiplexer) 205 to allow both the SD host interface 112a and the PCIe®/NVMe® interface 112a to access electrical pathways 203c. Likewise, host 102 has a MUX/DeMUX 204 to allow the SD host controller 104a and the PCIe®/NVMe® interface 104a to access electrical pathways 203c. Some of the electrical pathways may be used exclusively by the PCIe® interface 112a or the SD interface 112b. For example, the PCIe® interface 112a may use electrical pathways 203a for PCIe® protocol transmit (Tx+, Tx−) and PCIe® protocol receive (Rx+, Rx−), which are not used by the SD protocol interface 112b. The SD protocol interface 112b may use electrical pathways 203b for CLK (clock) and CMD (command), which are not used by the PCIe® protocol interface 112a. Electrical pathways 203d may be used for providing power (e.g., 3.3V, 1.8V).

When the hybrid memory card 200 is connected to the host 102, the hybrid memory card 200 may be initialized through either the SD interface 112b or the PCIe® interface 112a. In one embodiment, the hybrid memory card 200 is first initialized through the SD interface 112b to enter an SD mode of operation. Then, the hybrid memory card 200 may optionally be initialized through the PCIe® interface 112a to enter a PCIe® protocol mode of operation. However, another option is for the hybrid memory card 200 to be initialized through the PCIe® interface 112a to enter the PCIe® protocol mode of operation when the hybrid memory card 200 is connected to the host 102.

The hybrid memory card 200 has a mode that allows the host 102 to access (e.g., read, write) the host external RAM 134, which may be RAM, SRAM, DRAM, etc. The host 102 may be provided the option to enable only the host external RAM 134, only the flash storage 226, or both the host external RAM 134 and the flash storage 226. In response to the host requesting access to external RAM 134, the hybrid memory card 200 enables the host external RAM 134 for dynamic random-access transactions. The hybrid memory card 200 may also enable flash storage 226 for host access transactions. The protocol converter 132 converts between PCIe® protocol data transactions and DDR protocol data transactions. The DDR interface 236 is one example of RAM interface 136. The DDR interface 236 communicates with host external RAM 134.

The NVMe® controller 220 is one example of storage controller 120. An NVMe® controller 220 is a storage controller that is configured to implement storage controller functions of an NVMe® protocol and/or specification. The NVMe® controller 220 performs memory operations, such as programming, erasing, reading, and memory management processes with respect to the non-volatile storage 126. The NVMe® controller 220 volatile memory (e.g., DRAM, SRAM) 224 is used by the NVMe® controller 220 for purposes of accessing and managing the flash storage 226.

Figure 3:
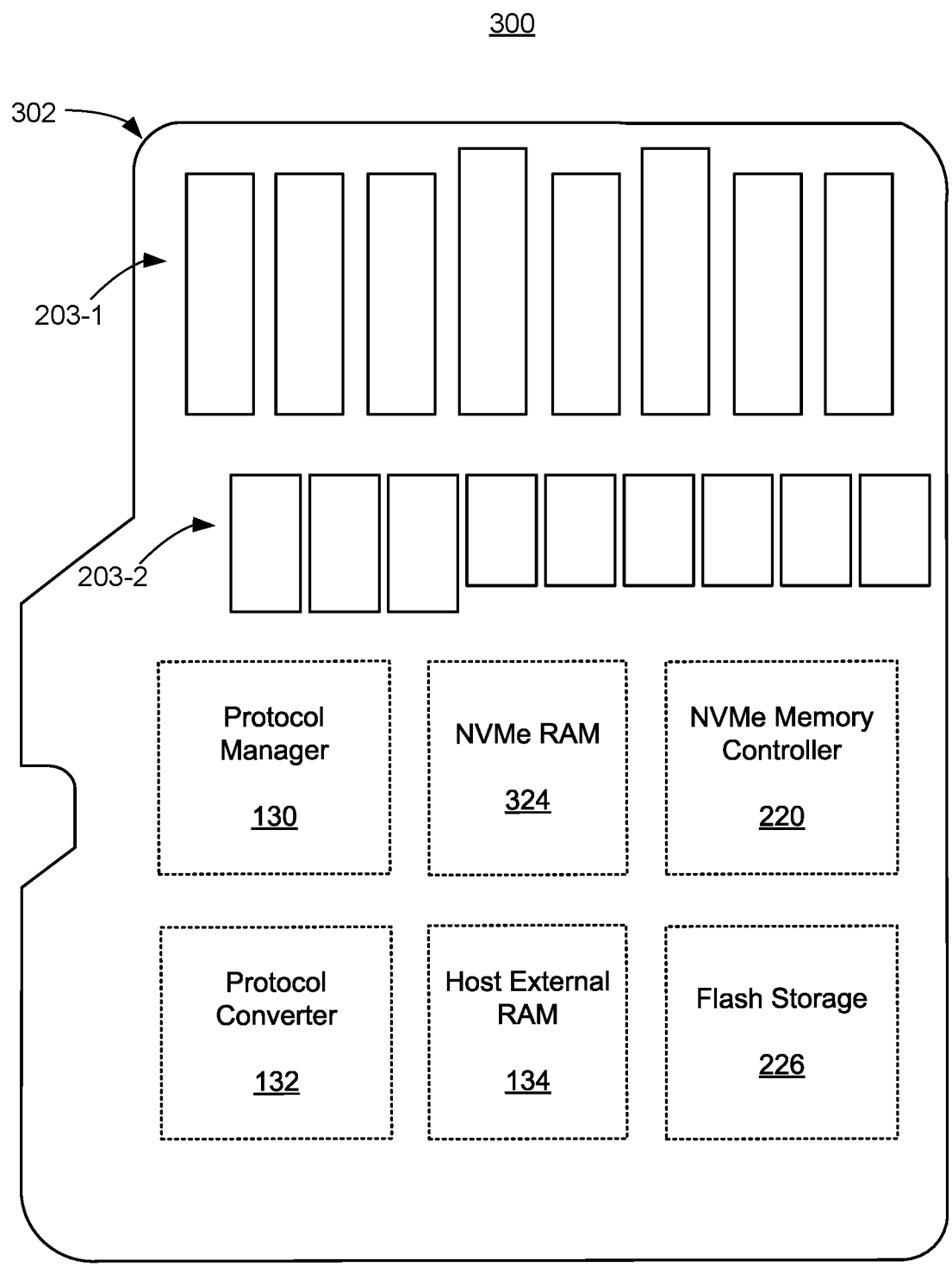
FIG. 3 is a diagram of one embodiment of a hybrid memory card that is configured to provide host access to RAM as well as to flash storage.

FIG. 2 is one example of a hybrid memory card 200 that may implement the hybrid memory system 100. Other types of memory card 200 may be used. Moreover, the combination of the SD interface 112b and the PCIe® interface is one example of a memory card interface. However, the hybrid memory card is not limited to having an SD interface 112b or a PCIe® interface. The hybrid memory card may have a variety of form factors. FIG. 3 is a diagram of one embodiment of a hybrid memory card that is configured to provide host access to RAM as well as to flash storage. The hybrid memory card 300 has a form factor of an SD card in FIG. 3. However, the hybrid memory card 300 is not required to be an SD card. The hybrid memory card 300 has a body 302 that houses the host external RAM 134, flash storage 226, RAM 224, the protocol manager 130, the protocol converter 132, and the NVMe® controller 220. These components are depicted in dashed line to indicate that they reside within the body 302. The body 302 supports two rows of electrical contacts 203-1, 203-2. The electrical contacts 203-1, 203-2 form a portion of the electrical pathways 203. Some of the electrical contacts 203-1, 203-2 might only be used for the SD interface, some electrical contacts might only be used for the PCIe® interface, and some contacts might be used for both the SD interface and the PCIe® interface. The hybrid memory card 300 could have more or fewer than two rows of electrical contacts 203-1, 203-2. Moreover, the number and size of the electrical contacts may vary by implementation.

Figure 4:
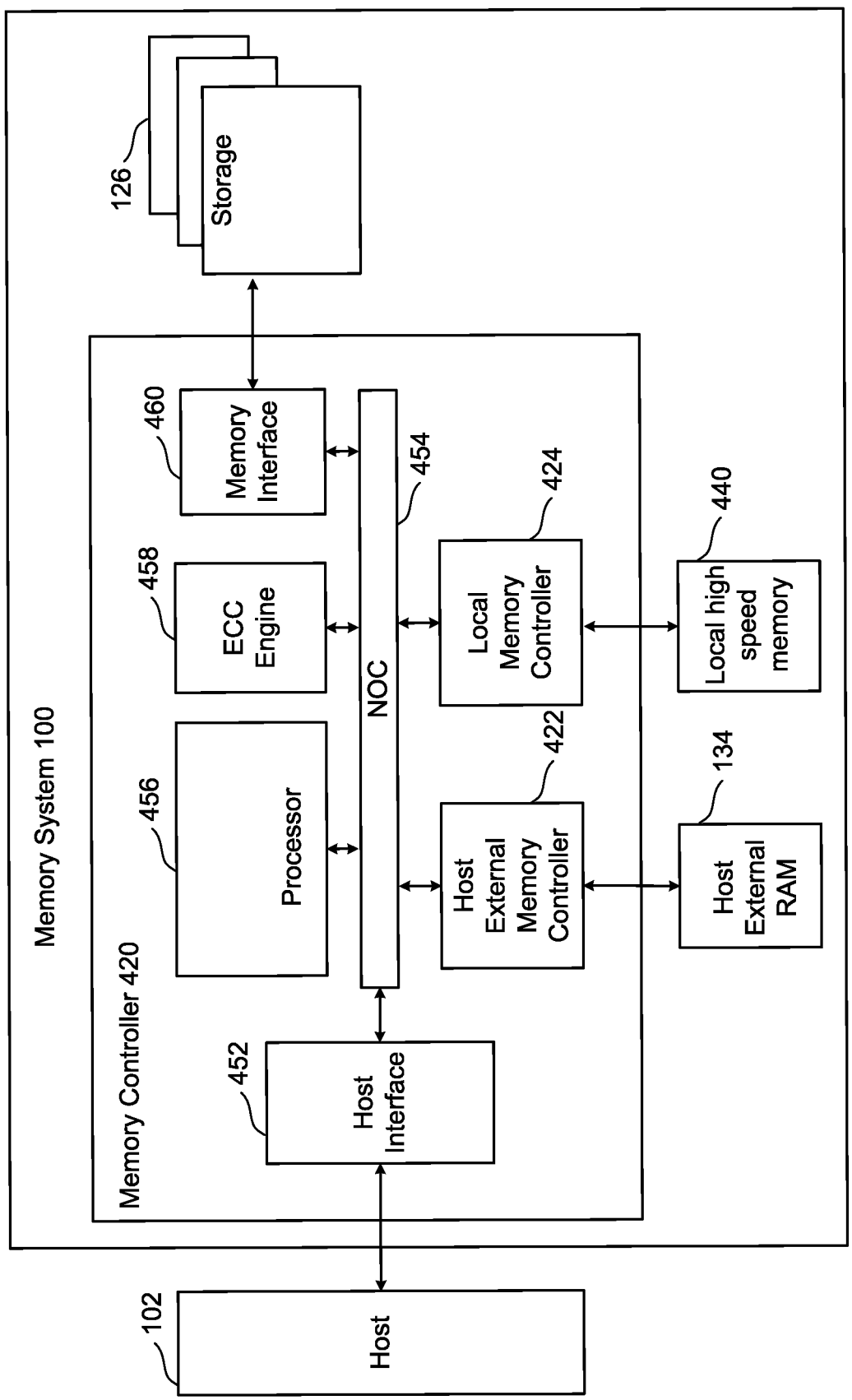
FIG. 4 is a block diagram of one embodiment of a hybrid memory system that implements the technology described herein.

FIG. 4 is a block diagram of one embodiment of a hybrid memory system 100 that implements the technology described herein. In one embodiment, hybrid memory system 100 is a hybrid memory card. However, hybrid memory system 100 can be a USB drive, or solid state drive ("SSD")

or other type of memory system. The proposed technology is not limited to any one type of memory system.

Hybrid memory system 100 may be connected to host 102, which can be a computer, server, electronic device (e.g., smart phone, tablet or other mobile device), appliance, or another apparatus that uses memory and has data processing capabilities. In some embodiments, host 102 is separate from, but connected to, hybrid memory system 100. In other embodiments, hybrid memory system 100 is embedded within host 102.

The components of hybrid memory system 100 depicted in FIG. 4 are electrical circuits. Hybrid memory system 100 includes a memory controller 420 (or storage controller) connected to non-volatile storage 126 and local high speed memory 440 (e.g., DRAM, SRAM). Local memory 440 is non-transitory memory, which may include volatile memory or non-volatile memory. Local high speed memory 440 is used by memory controller 420 to perform certain operations. For example, local high speed memory 440 may store logical to physical address translation tables ("L2P tables").

Memory controller 420 comprises a host interface 452 that is connected to and in communication with host 102. In one embodiment, host interface 452 implements an NVM Express (NVMe®) over PCI Express (PCIe®). Other interfaces can also be used, such as SCSI, SATA, etc. Host interface 452 is also connected to a network-on-chip (NOC) 454. A NOC is a communication subsystem on an integrated circuit. NOC's can span synchronous and asynchronous clock domains or use asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 454 can be replaced by a bus. Connected to and in communication with NOC 454 is processor 456, error correction code (ECC) engine 458, memory interface 460, local memory controller 424, and host external memory controller 422. Local memory controller 424 is used to operate and communicate with local high speed memory 440 (e.g., DRAM, SRAM).

Host external memory controller 422 is used to operate and communicate with host external RAM memory 134 (e.g., DRAM, SRAM). Host external memory controller 422 provides the host 102 with access to the host external RAM 134. In an embodiment, the host external memory controller 422 implements the protocol manager 130 and the protocol converter 132. All or a portion of the host external memory controller 422 may be implemented on the processor 456.

ECC engine 458 performs error correction services. For example, ECC engine 458 performs data encoding and decoding. In one embodiment, ECC engine 458 is an electrical circuit programmed by software. For example, ECC engine 458 can be a processor that can be programmed. In other embodiments, ECC engine 458 is a custom and dedicated hardware circuit without any software. In another embodiment, the function of ECC engine 458 is implemented by processor 456.

Processor 456 performs the various controller memory operations, such as programming, erasing, reading, and memory management processes. In one embodiment, processor 456 is programmed by firmware. In other embodiments, processor 456 is a custom and dedicated hardware circuit without any software. Processor 456 also implements a translation module, as a software/firmware process or as a dedicated hardware circuit. In many systems, the non-volatile storage is addressed internally to the storage system using physical addresses associated with one or more memory die in non-volatile storage 126. However, the host system will use logical addresses to address the various memory locations. This enables the host to assign data to consecutive logical addresses, while the storage system is free to store the data as it wishes among the locations of the one or more memory die. To implement this system, memory controller 420 (e.g., the translation module) performs address translation between the logical addresses used by the host and the physical addresses used by the memory die. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 440 cannot hold all of the L2P tables. In such a case, the entire set of L2P tables are stored in non-volatile storage 126 and a subset of the L2P tables are cached (L2P cache) in the local high speed memory 440.

Memory interface 460 communicates with non-volatile storage 126. In one embodiment, memory interface provides a Toggle Mode interface. Other interfaces can also be used. In some example implementations, memory interface 460 (or another portion of memory controller 420) implements a scheduler and buffer for transmitting data to and receiving data from one or more memory die.

Figure 5:
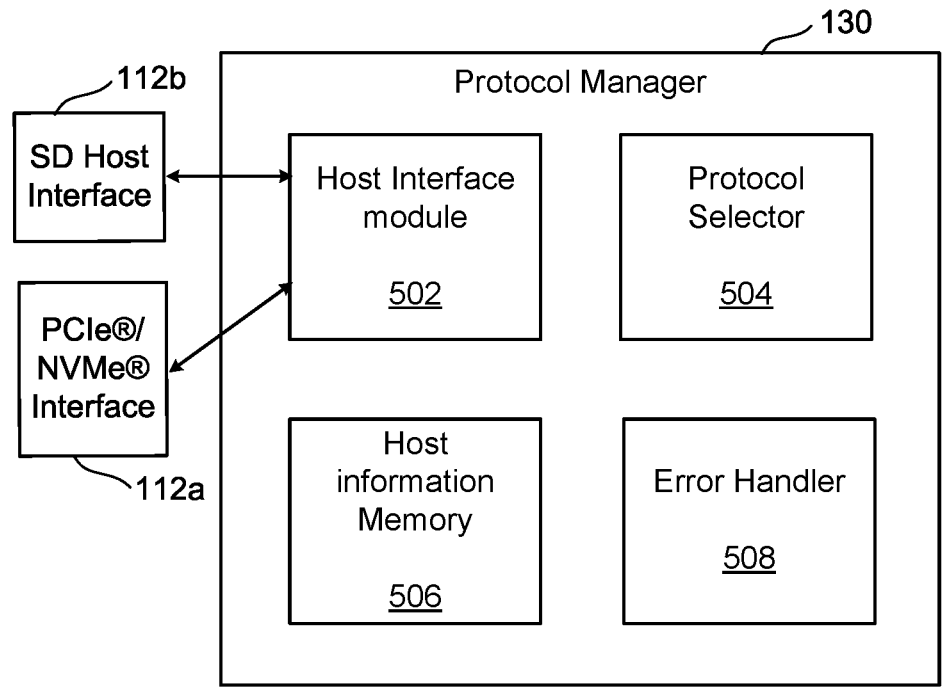
FIG. 5 is a diagram that provides further details of an embodiment of a protocol manager of the hybrid memory system.

FIG. 5 is a diagram that provides further details of an embodiment of the protocol manager 130. The protocol manager 130 has a host interface module 502, a protocol selector 504, host information memory 506, and error handler 508. The protocol manager 130 is responsible for managing incoming data packets and checking whether the host 102 has requested access to the non-volatile storage 126 or the host external RAM 134. In an embodiment, the protocol manager 130 interfaces with a PCIe®/NVMe® interface 112*a* and also an SD host interface 112*b*. The SD host interface 112*b* is not a requirement and may be replaced another type of host interface. Also the PCIe®/NVMe® interface 112*a* may be replaced with an interface of a different protocol. The host interface module 502 is configured to communicate over the PCIe®/NVMe® interface 112*a* and to analyze data packets received over the PCIe®/NVMe® interface 112*a*. When the hybrid memory system 100 is connected to the host PHY interface (e.g., PCIe® Express slot), the hybrid memory system 100 is initialized via power-up. The protocol selector 504 is responsible for negotiating the compatible packets received from the host side and identifying the requested protocol. In an embodiment, the requested protocol could include SD protocol, PCIe® protocol, or DDR protocol transactions. Responsive to RAM transactions (e.g., DDR transactions) being requested by the host 102 the packets are processed by the protocol converter 132. Responsive to flash transactions being requested by the host 102 the packets are processed by the storage controller 120. The host information memory 506 is used to store information such as the access mode selected by the host 102. The error handler 508 is responsible for error handling and recovery responsive to initialization failing due to any reason and re-initializes the hybrid memory system 100.

Figure 6:
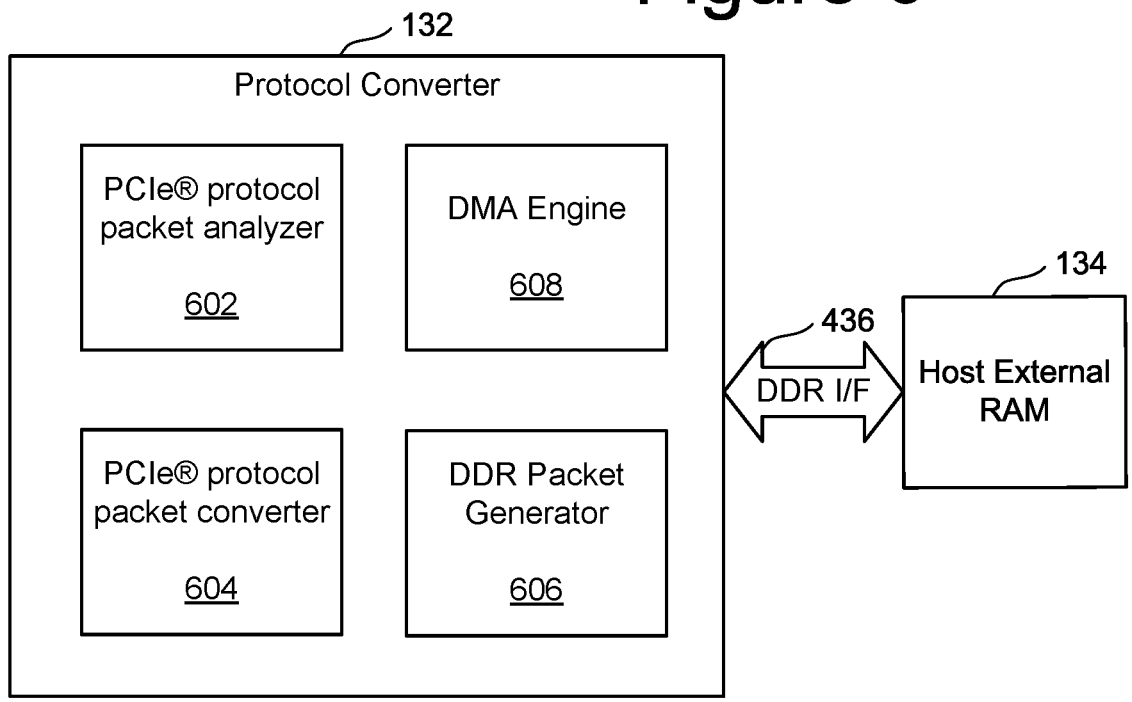
FIG. 6 is a diagram that provides further details of an embodiment of a protocol converter of the hybrid memory system.

FIG. 6 is a diagram that provides further details of an embodiment of the protocol converter 132. The protocol converter 132 has a PCIe® protocol packet analyzer 602, PCIe® protocol packet converter 604, DDR protocol packet generator 606, and DMA engine 608. The protocol converter 132 converts between a PCIe® protocol and a DDR protocol. An embodiment of the protocol converter 132 converts PCIe® protocol data packets to DDR packets for write and read operations to the host external RAM 134, resulting in host RAM expansion. The PCIe® protocol packet analyzer 602 validates and parses packets and/or data received from the protocol manager 130. The PCIe® protocol packet converter 604 converts PCIe® protocol packets to DDR protocol packets. The DDR protocol packet generator creates a data packet to store in the host external RAM 134. The DMA engine 608 controls data transfer needed to provide the host 102 with access to the host external RAM 134. In one embodiment, the DMA engine 608 sends the DDR packet that was generated by DDR packet generator 606 to the host external RAM 134.

Figure 7:
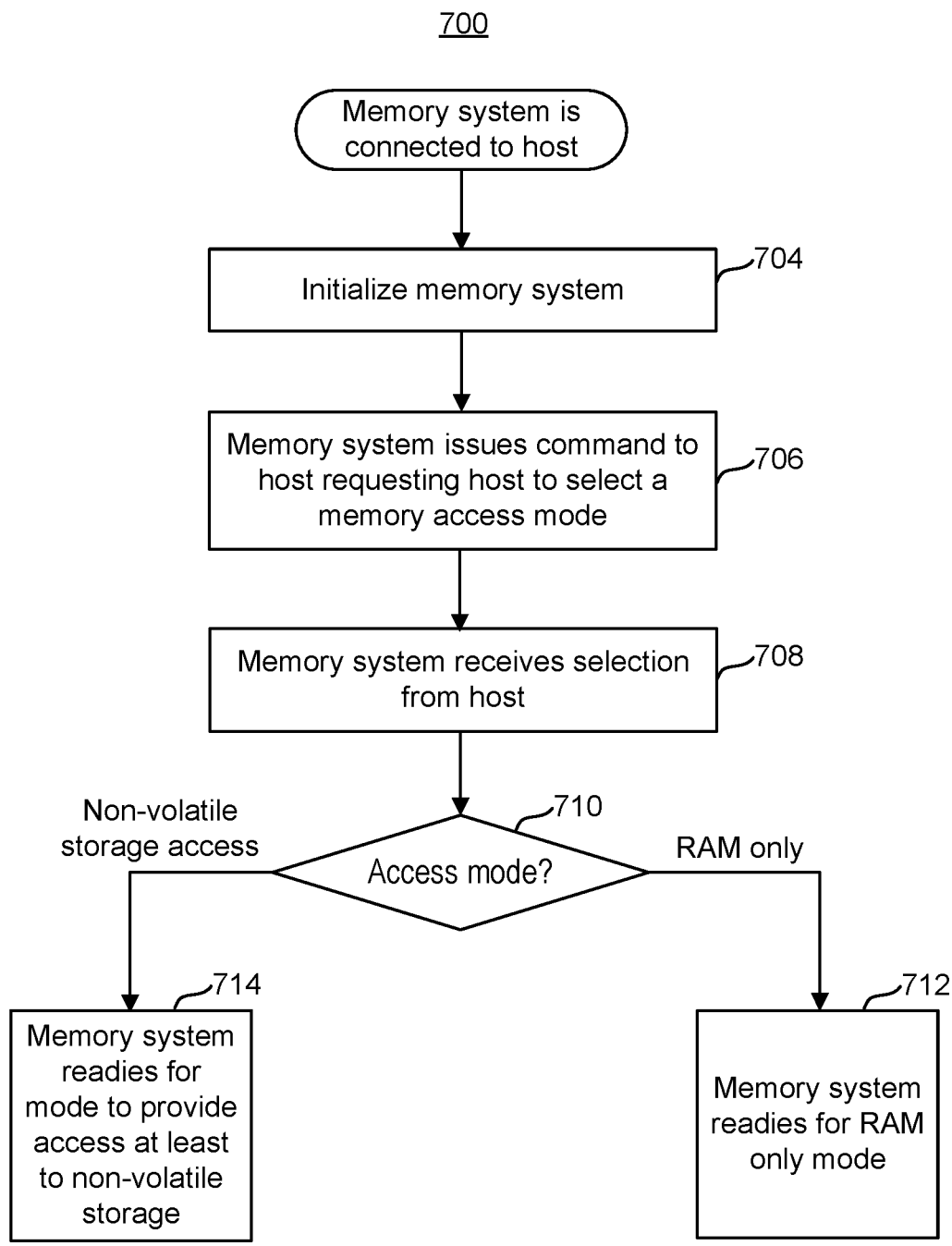
FIG. 7 is a flowchart of one embodiment of a process of readying the hybrid memory system for a host access mode.

FIG. 7 is a flowchart of one embodiment of a process 700 of readying the hybrid memory system 100 for a host access mode. The process 700 is initiated in response to the hybrid memory system 100 being connected to the host 102. This action may be performed by a user inserting the hybrid memory system 100 (which may include hybrid memory card 200, 300) into a slot in the host 102. In an embodiment, the hybrid memory system 100 connects with a PCI Express slot on the host 102 via a PCI Express root complex. Step 704 includes initializing the hybrid memory system 100. In one embodiment, the hybrid memory system 100 is initialized in a Peripheral Component Interconnect Express mode in step 704. In one embodiment, the hybrid memory system 100 is first initialized in an SD mode and then initialized to the Peripheral Component Interconnect Express mode in step 704. Initializing in a Peripheral Component Interconnect Express mode means to initialize the hybrid memory system 100 in accordance with a Peripheral Component Interconnect Express Specification for operation in which communication is performed over a Peripheral Component Interconnect Express interface. Initializing in an SD mode means to initialize the hybrid memory system 100 in accordance with an SD Specification for operation in which communication is performed over an SD interface.

Step 706 includes the hybrid memory system 100 issuing a command to the host 102 requesting the host to select a memory access mode. The memory access modes include at least a first mode in which the host 102 only has access to the host external RAM 134 and a second mode in which the host 102 has access to at least the non-volatile storage 126. In one embodiment, the second mode includes access to both the host external RAM 134 and the non-volatile storage 126. In one embodiment, the second mode includes access to only the non-volatile storage 126. In one embodiment, in addition to the first mode, the host has the option to select access to both the host external RAM 134 and the non-volatile storage 126 or to select access to only the non-volatile storage 126.

Step 708 includes the hybrid memory system 100 receiving the selection of the mode of access from the host 102.

Step 710 is a determination by the hybrid memory system 100 of which access mode was selected. Responsive to the host 102 selecting the first access mode the hybrid memory system 100, in step 712, readies itself for the access mode in which the host 102 has access to the host external RAM 134 but not to the non-volatile storage 126. Responsive to the host 102 selecting the second access mode the hybrid memory system 100, in step 714, readies itself for the access mode in which the host 102 has access to at least the non-volatile storage 126. Step 714 may include readying the hybrid memory system 100 for host access to only the non-volatile storage 126. Step 714 may alternatively include readying the hybrid memory system 100 for host access to both the non-volatile storage 126 and the host external RAM 134.

Figure 8:
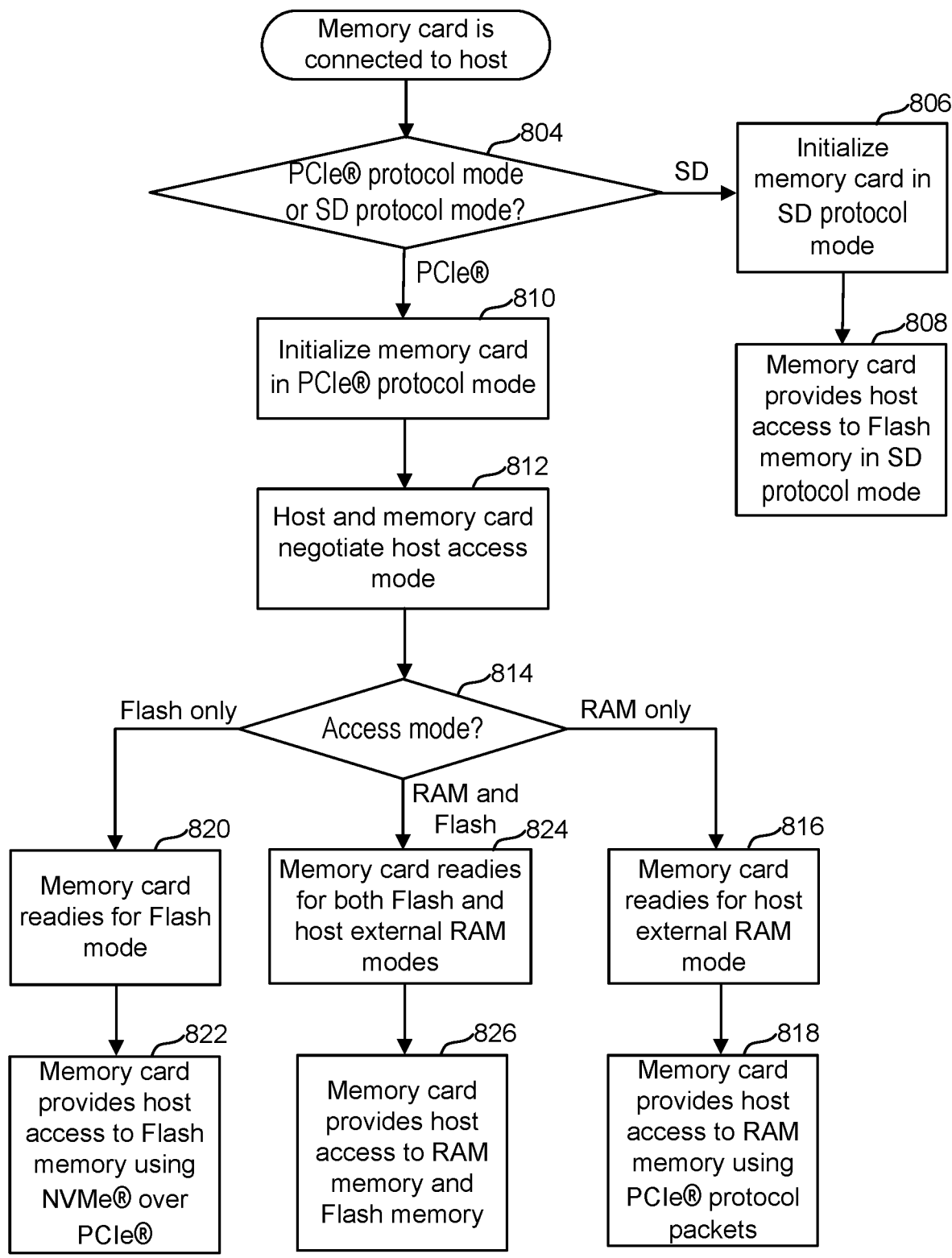
FIG. 8 is a flowchart of an embodiment of a process of setting up a hybrid memory card for a host mode of access.

In one embodiment, the hybrid memory system 100 includes a memory card such as an SD card. FIG. 8 is a flowchart of an embodiment of a process 800 of setting up an SD card for a host mode of access. The process 800 provides further details of one embodiment of the process in FIG. 7. The process 800 begins in response to the hybrid memory card being connected to the host 102. For example, a user may insert the hybrid memory card into a memory card slot in the host 102.

Step 804 includes a determination by the hybrid memory card whether the host is requesting to operate in an SD protocol mode or a PCIe® protocol mode. Responsive to the SD protocol mode being requested step 806 includes initializing the hybrid memory card in the SD protocol mode. Step 808 includes the hybrid memory card providing the host 102 access to flash storage 226 in the SD protocol mode. The NVMe® controller 220 may control access to the flash storage 226 in the SD protocol mode.

If the PCIe® protocol mode is requested then step 810 includes initializing the hybrid memory card in the PCIe® protocol mode. Step 812 includes the host 102 and the hybrid memory card negotiating the host access mode. Step 812 may include the hybrid memory card 200 sending a command to the host 102, requesting that the host select a host access mode. The host 102 may configure the host system settings to show various host access options. The host 102 may respond to the hybrid memory card 200 based on the host system settings. Step 814 includes the hybrid memory card determining what access mode was selected. Responsive to the host 102 selecting the RAM only mode the hybrid memory card, in step 816, readies itself for the host external RAM mode. Step 818 includes the hybrid memory card providing host access to RAM 134 using PCIe® protocol packets over the PCIe®/NVMe® interface 112a.

If the host 102 selects the flash storage only mode, then in step 820 the hybrid memory card readies itself for the flash storage mode. Step 822 includes the hybrid memory card providing host access to flash storage using NVMe® over PCIe® using PCIe® protocol packets over the PCIe®/NVMe® interface 112a. Access to the flash storage may be controlled by the NVMe® controller 220.

If the host 102 selects the flash and RAM mode, then in step 824 the hybrid memory card readies itself for the flash and RAM mode. Step 826 includes the hybrid memory card providing host access to flash storage and RAM. The protocol manager 130 may analyze PCIe® protocol packets from the host 102 to determine whether the host is requested to access flash storage or host external RAM 134. Access to the host external RAM 134 may be controlled by the protocol manager 130 and the protocol converter 132. Access to the flash storage may be controlled by the NVMe® controller 220.

Figure 9:
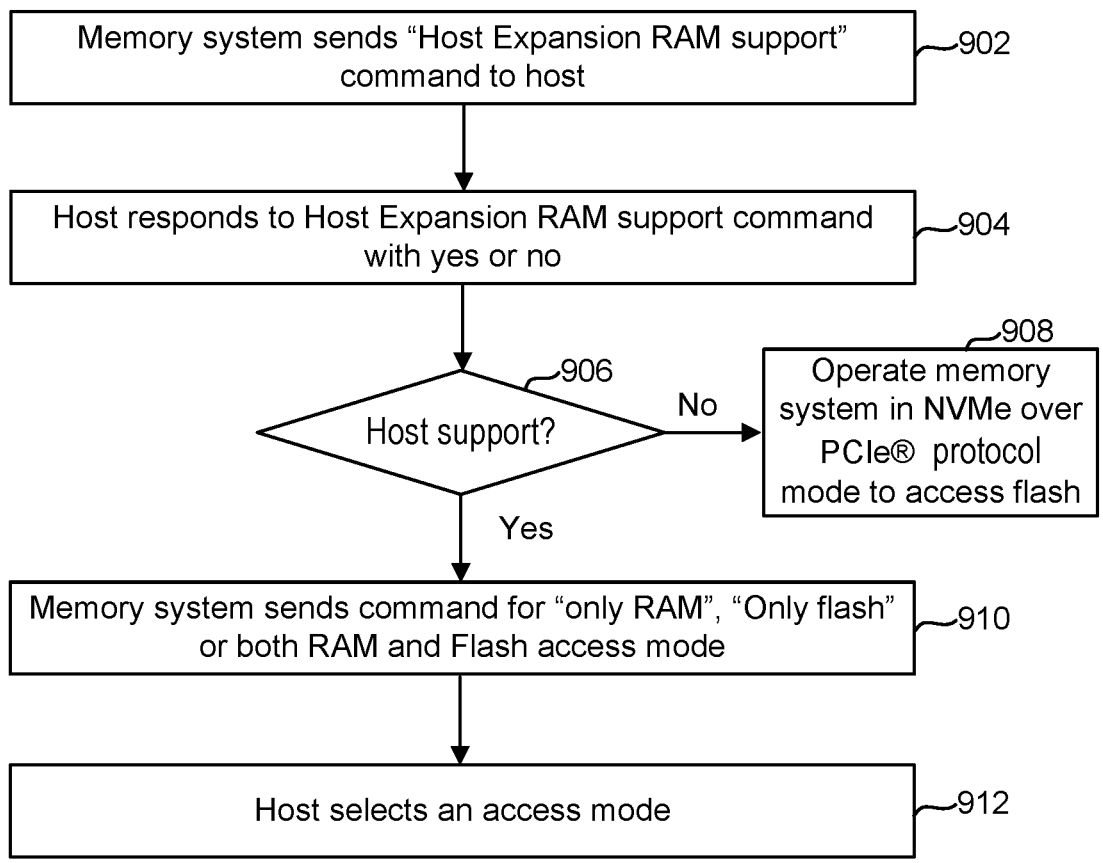
FIG. 9 is a flowchart that provides further details of an embodiment of a process of the hybrid memory system and host negotiating a host access mode.

FIG. 9 is a flowchart that provides further details of an embodiment of a process 900 of the hybrid memory system 100 and host 102 negotiating a host access mode. The process 900 may be performed in steps 706 and 708 of FIG. 7 or step 712 of FIG. 7. Prior to process 900 the hybrid memory system 100 may be connected to the host 102. Furthermore, the hybrid memory system 100 may be initialized into a mode such as a PCIe® protocol mode. However, the hybrid memory system 100 may be initialized into a protocol mode other than PCIe® protocol.

Step 902 includes the hybrid memory system 100 sending a Host Expansion RAM Support command to the host 102. This command is requesting that the host 102 indicate whether or not the host 102 itself supports the access mode in which the host has access to host external RAM 134 in the hybrid memory system 100. In an embodiment, the host 102 should reply with a yes if the host supports either the RAM only mode or the RAM and non-volatile storage (e.g., flash) mode.

Step 904 includes the host 102 responding to the command with a yes or no. Step The host 102 may be configured to show various host access options in, for example, host system settings. The host 102 may respond to the hybrid memory system 100 based on the host system settings. However, the host 102 may use another technique to enable a user to select the host access mode. Step 906 includes a determination of how to proceed in view of the host response. Responsive to the host 102 responding to the command with "no" the hybrid memory system 100, in step 908, is operated in an NVMe® over PCIe® protocol mode to access flash storage.

If the host 102 responds to the command with "yes", then in step 910 the hybrid memory system 100 sends another command to the host 102 to request that the host 102 specify the host access mode. In an embodiment, there are three access modes: 1) only flash access, 2) only RAM access, and 3) access to both RAM and flash.

In step 912 the host 102 responds with a selection of the host access mode. After the host selection, the hybrid memory system prepares for the selected access mode.

Figure 10:
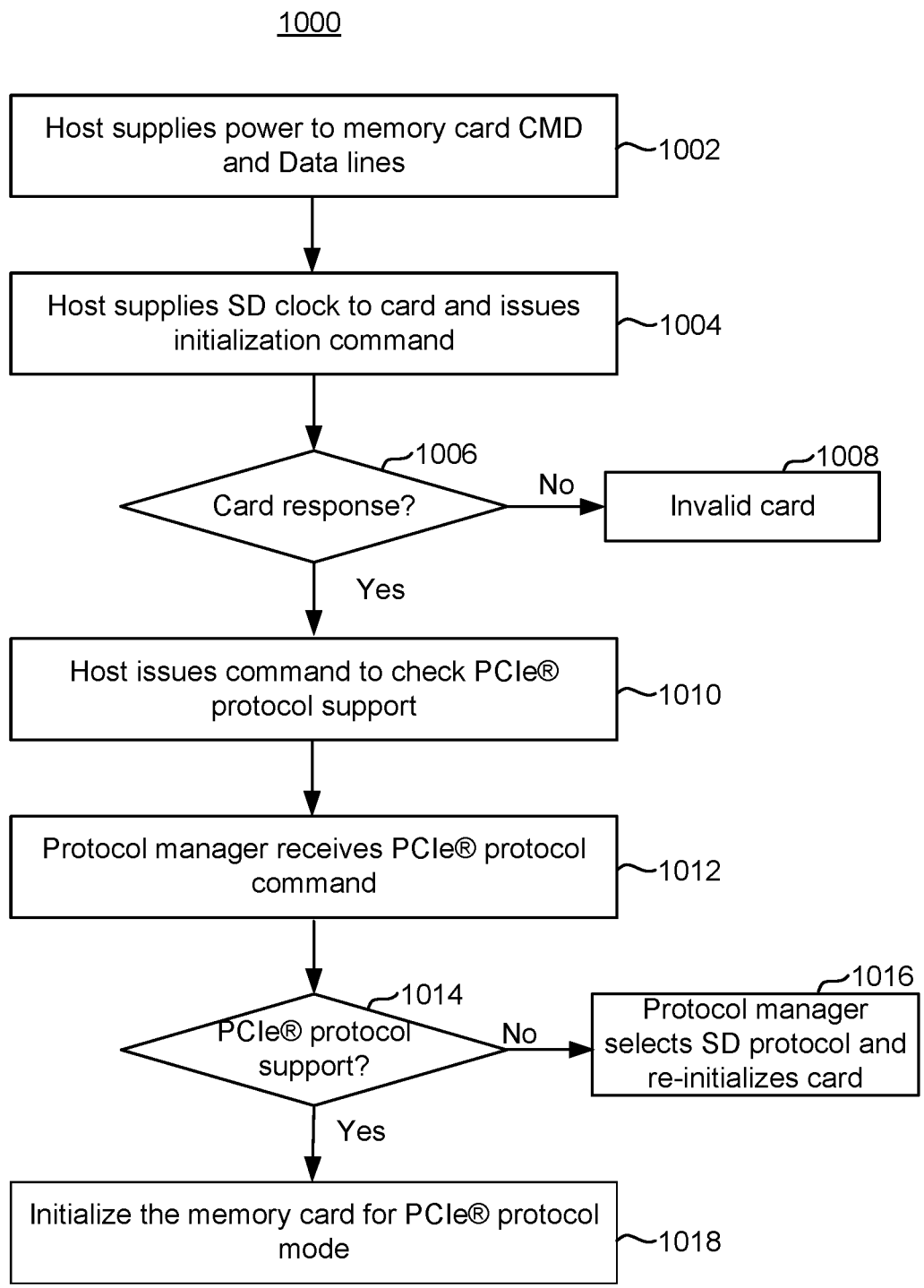
FIG. 10 is a flowchart of one embodiment of a process the first steps of initializing a hybrid memory card upon the memory card being connected to the host.

FIG. 10 is a flowchart of one embodiment of a process 1000 of the first steps of initializing a hybrid memory card upon the hybrid memory card being connected to the host 102. Process 1000 is performed during one embodiment of step 704 in FIG. 7. The discussion of process 1000 will omit some details of initializing a hybrid memory card that are well-known to those of ordinary skill in the art. The process 1000 begins in response to the hybrid memory card being connected to the host 102. The hybrid memory card may be inserted in a PCIe®/SD slot (e.g., PCIe® Express slot). In step 1002, the host 102 supplies power to the hybrid memory card 200 CMD line and data lines. In an embodiment, the data lines are among the electrical pathways 203c (see FIG. 2). Thus, the data lines may be associated with the SD interface. In an embodiment, the CMD line is among the electrical pathways 203b that is associated with the SD interface (see FIG. 2).

Step 1004 includes the host 102 supplying the SD clock to the card and issuing an initialization command. In an embodiment, the SD clock line is among the electrical pathways 203b associated with the SD interface (see FIG. 2). Step 1006 includes the host 102 determining the hybrid memory card's response. No response from the hybrid memory card 200 results in the host 102 determining that the hybrid memory card is invalid (step 1008), in which case the process 1000 ends.

Following a positive response from the hybrid memory card 200, at step 1010 the host 102 issues a command to check whether the hybrid memory card 200 supports a PCIe® protocol mode of operation. At step 1012 the protocol manager 130 receives the PCIe® protocol support command. Response to the protocol manager 130 determining (at step 1014) that PCIe® protocol support is not available in step 1016 the protocol manager 130 selects to re-initialize the hybrid memory card for SD protocol mode of operation. Further details of initializing the hybrid memory card 200 for SD protocol mode of operation are discussed below in connection with FIG. 12.

If at step 1014 the protocol manager 130 determines that PCIe® protocol support is available then in step 1018 the hybrid memory card 200 is initialized for a PCIe® protocol mode of operation. Further details of initializing the hybrid memory card 200 for PCIe® protocol mode of operation are discussed below in connection with FIG. 11.

Figure 11:
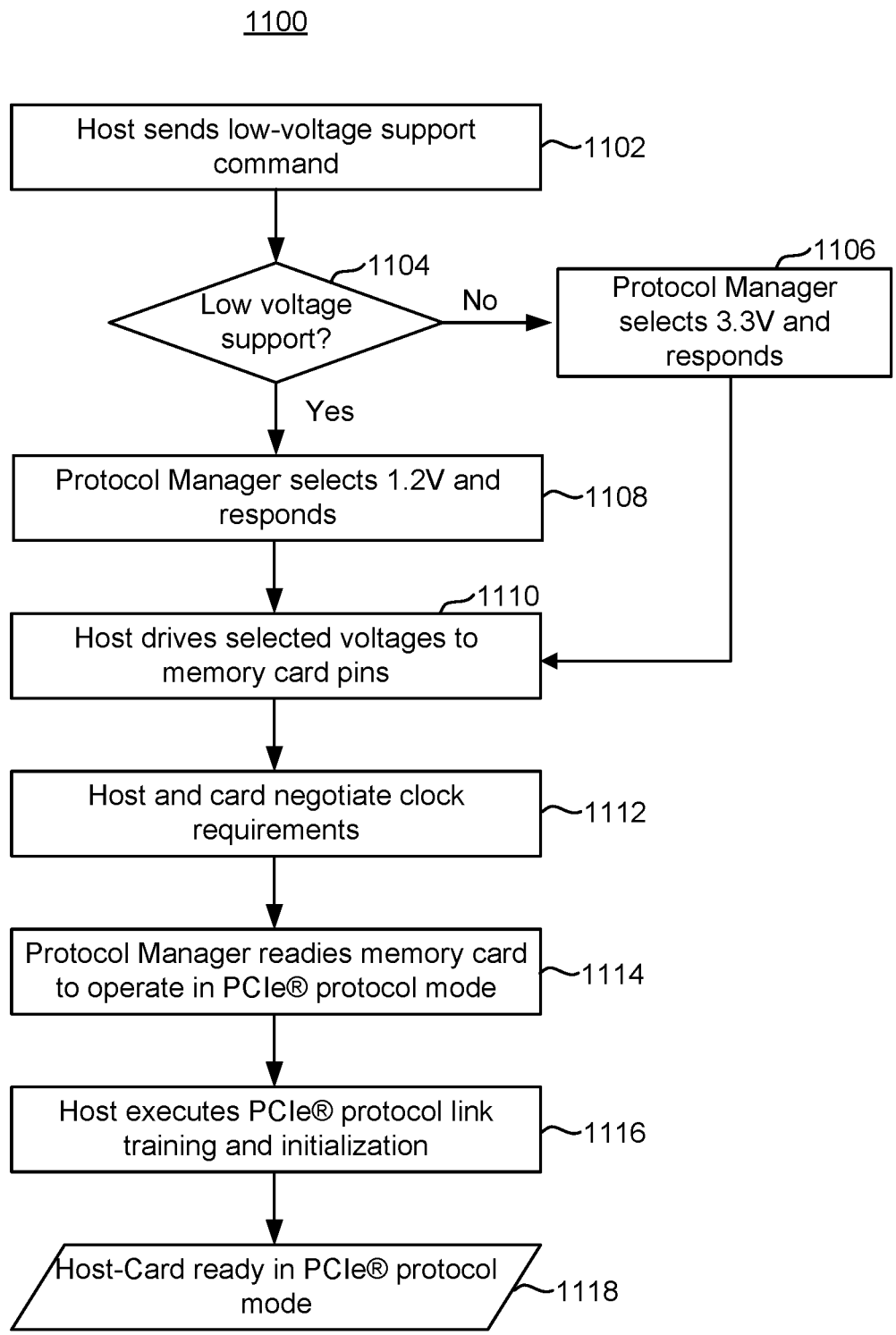
FIG. 11 is a flowchart of one embodiment of a process of initializing a hybrid memory card for a Peripheral Component Interconnect Express mode.

FIG. 11 is a flowchart of one embodiment of a process 1100 of initializing a hybrid memory card 200 for a PCIe® protocol mode. Process 1100 may be used in step 1018 in FIG. 10 and/or step 810 in FIG. 8. The discussion of process 1100 will omit some details of initializing a hybrid memory card to a PCIe® protocol mode that are well-known to those of ordinary skill in the art. Step 1102 includes the host 102 sending a low-voltage support command. This command requests that the hybrid memory card 200 indicate whether it supports a low-voltage mode. If the hybrid memory card 200 does not support the low-voltage mode (step 1104 is no), then at step 1106 the protocol manager 130 of the hybrid memory card 200 selects a 3.3V mode and responds to the host 102. The 3.3V mode is one example of a higher voltage mode, which could be greater or less than 3.3V. If the hybrid memory card 200 does support the low-voltage mode (step 1104 is yes), then at step 1108 the protocol manager 130 of the hybrid memory card 200 selects a 1.2V mode and responds to the host 102. The 1.2V mode is one example of a lower voltage mode, which could be greater or less than 1.2V.

After the host 102 receives the response, at step 1110 the host 102 drives the selected voltages to the hybrid memory card's pins. The voltages may be provided over electrical pathways 203d (see FIG. 2) At step 1112 the host 102 and the hybrid memory card 200 negotiate clock requirements. At step 1114 the protocol manager 130 readies the hybrid memory card 200 to operation in PCIe® protocol mode. At step 1116 the host 102 executes PCIe® protocol link training and initialization. At step 1118 the host 102 and the hybrid memory card 200 are ready in the PCIe® protocol mode.

Figure 12:
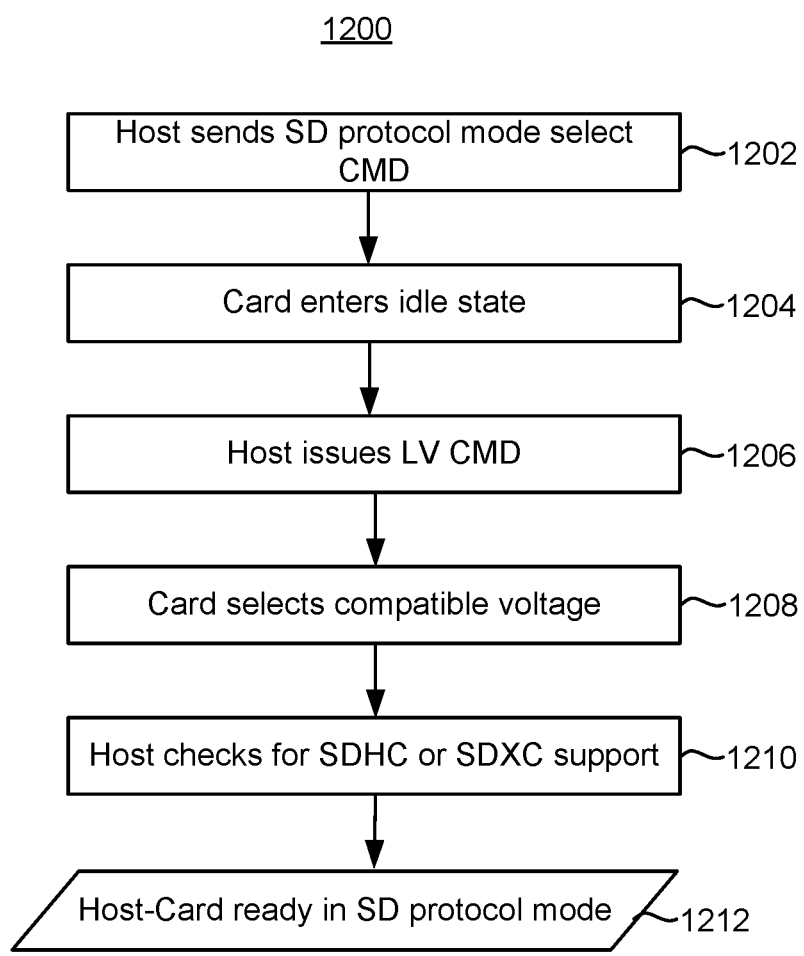
FIG. 12 is a flowchart of one embodiment of a process of initializing a hybrid memory card a Secure Digital (SD) mode.

FIG. 12 is a flowchart of one embodiment of a process 1200 of initializing a hybrid memory card 200 for an SD protocol mode. Process 1100 may be used in step 806 in FIG. 8 and/or step 1016 in FIG. 10. The discussion of process 1200 will omit some details of initializing a memory card to an SD protocol mode that are well-known to those of ordinary skill in the art. Step 1202 includes the host 102 sending an SD mode select command to the hybrid memory card 200. Step 1204 includes the hybrid memory card 200 entering an idle state. Step 1206 includes the host issuing a low voltage command, which request the hybrid memory card 200 to select a compatible voltage. Step 1208 includes the hybrid memory card 200 selecting a compatible voltage. Step 1210 includes the host 102 checking for Secure Digital High Capacity (SDHC) or Secure Digital eXtended Capacity (SDXC) support. At step 1212 the host 102 and hybrid memory card 200 are ready for the SD protocol mode.

Figure 13:
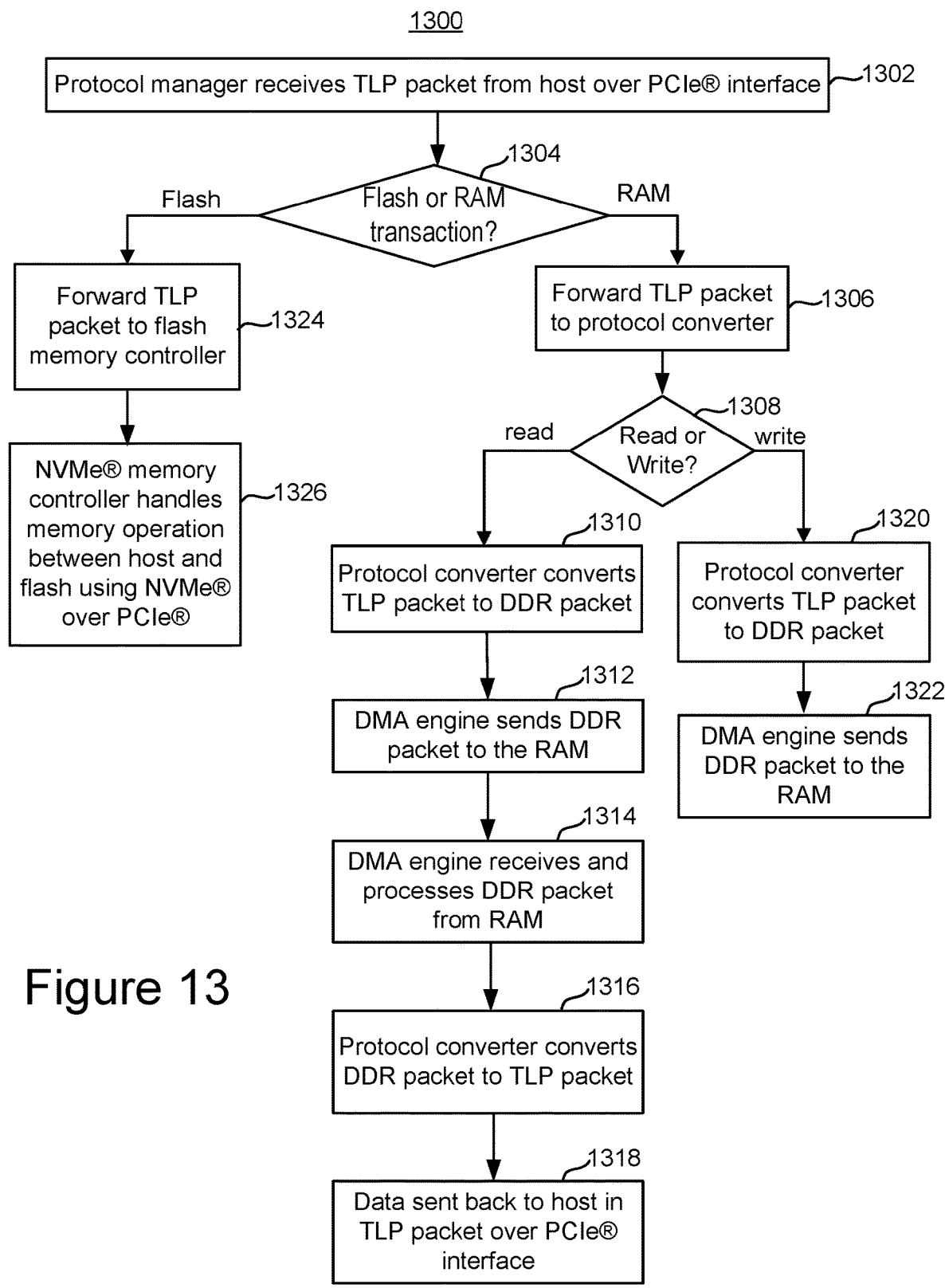
FIG. 13 is a flowchart of one embodiment of a process of handling host access requests to a hybrid memory system.

FIG. 13 is a flowchart of one embodiment of a process 1300 of handling host access requests to a hybrid memory system 100. Process 1300 may be performed while in a PCIe® protocol mode. The process 1300 provides further details of an embodiment of steps 818, 822, and 826 of process 800. Step 1302 includes the protocol manager 130 receiving a TLP packet from the host 102 over the PCIe® interface 112*a*. Step 1304 is a determination of whether the request is to access Flash storage 226 or host external RAM 134. In one embodiment, this determination is made based on a field in the TLP packet. Response to this being a request to access host external RAM 134 the TLP packet is forwarded to the protocol converter 132 in step 1306. Step 1308 includes a determination of whether this is a read or a write request. For a read request step 1310 includes the protocol converter 132 converting the TLP packet to a DDR packet. Step 1312 includes the DMA engine 608 of the protocol converter 132 sending the DDR packet to the host external RAM 134. Step 1314 includes the DMA engine 608 receiving and processing a DDR packet from the host external RAM 134. Step 1316 includes the protocol converter 132 converting the DDR packet to a TLP packet. Step 1318 includes sending the data to the host 102 in a TLP packet. The protocol converter 132 may send the TLP packet to the protocol manger 130, wherein the protocol manger 130 sends the TLP packet over the PCIe interface 112*a* to the host 102. Returning to the discussion of step 1308, for a write request step 1320 includes the protocol converter 132 converting the TLP packet to a DDR packet. Note that the TLP packet from the host 102 may contain the data to be written to the host external RAM 134. Step 1322 includes the DMA engine 608 of the protocol converter 132 sending the DDR packet to the host external RAM 134 to write the data.

Returning to the discussion of step 1304, responsive to the request being for Flash access, the protocol manager 130 forwards the TLP packet to the NVMe® controller 220 in step 1324. In step 1326 the NVMe® controller 220 controls access to the flash storage 226. Techniques for a NVMe® controller 220 controlling access to flash storage 226 are known to those of ordinary skill in the art. Step 1326 is not limited to any particular technique for a NVMe® controller 220 to control access to Flash storage over a PCIe® interface.

In view of the foregoing, an embodiment includes an apparatus comprises a physical communication interface configured to provide a physical interface to a host, a volatile memory, a non-volatile storage, and one or more control circuits in communication with the physical communication interface, the non-volatile storage, and the volatile memory. The one or more control circuits are configured, individually or in combination, to send a command to the host requesting that the host select a mode of access from a plurality of modes that include a first mode in which the host has access to only the volatile memory and a second mode in which the host has access to at least the non-volatile storage. The one or more control circuits are configured to operate the apparatus in the first mode responsive to a response from the host to operate in the first mode, the first mode including providing the host access to the volatile memory but not to the non-volatile storage. The one or more control circuits are configured to operate the apparatus in the second mode responsive to a response from the host to operate in the second mode, the second mode including providing the host access to the at least the non-volatile storage.

In a further embodiment, the physical communication interface comprises a Peripheral Component Interconnect Express interface. And the one or more control circuits are further configured, individually or in combination, to exchange data between the host and the volatile memory in the first mode over the Peripheral Component Interconnect Express interface.

In a further embodiment, the one or more control circuits are further configured, individually or in combination, to exchange data between the host and the volatile memory in the first mode using Transaction Layer Protocol (TLP) packets over the Peripheral Component Interconnect Express interface.

In a further embodiment, the one or more control circuits are further configured, individually or in combination, to communicate with the host over the Peripheral Component Interconnect Express interface using a Peripheral Component Interconnect Express protocol. The one or more control circuits are further configured to communicate with the volatile memory over a Double Date Rate (DDR) interface using a DDR protocol. The one or more control circuits are further configured to convert between the Peripheral Component Interconnect Express protocol and the DDR protocol to exchange the data between the host and the volatile memory in the first mode over the Peripheral Component Interconnect Express interface.

In a further embodiment, the non-volatile storage comprises flash storage. The one or more control circuits are further configured to determine whether a packet received over the Peripheral Component Interconnect Express interface in the second mode is a host request to access the volatile memory or the flash storage. The one or more control circuits are further configured, individually or in combination, to exchange data between the host and the flash storage using a Non-Volatile Memory Express protocol over the Peripheral Component Interconnect Express interface in response to a determination that the packet contains a request to access the flash storage. The one or more control circuits are further configured to exchange data between the host and the volatile memory using a Peripheral Component Interconnect Express protocol over the Peripheral Component Interconnect Express interface in response to a determination that the packet contains a request to access the volatile memory.

In a further embodiment, the one or more control circuits are further configured to receive first packets of a first protocol from the host over the physical communication interface. The one or more control circuits are further configured, individually or in combination, to determine whether the first packets are a request to access the volatile memory or the non-volatile storage. Responsive to a determination that the first packets are a request to access the volatile memory the one or more control circuits convert the first packets to second packets of a second protocol and send the second packets to the volatile memory to exchange data between the volatile memory and the host over the physical communication interface. The one or more control circuits exchange data between the host and the non-volatile storage over the physical communication interface using a third protocol responsive to a determination that the first packets are a request to access the non-volatile storage.

In a further embodiment, the apparatus comprises a memory card and the physical communication interface comprises contacts configured to be received by a memory card slot of the host.

In a further embodiment, the one or more control circuits are further configured, individually or in combination, to negotiate with the host to operate the memory card in a memory card mode in which the host has access to the non-volatile storage but not to the volatile memory.

In a further embodiment, the memory card has a Secure Digital (SD) form factor configured to be received by the memory card slot of the host.

In a further embodiment, the one or more control circuits are further configured, individually or in combination, to send the command to the host requesting that the host select the mode of access following initialization of the memory card into a Peripheral Component Interconnect Express protocol mode in response to the memory card being inserted into the memory card slot of the host.

In a further embodiment, in the second mode the host has access the non-volatile storage but not the volatile memory. The plurality of modes further includes a third mode in which the host has access to both the non-volatile storage and the volatile memory. The one or more control circuits are configured to operate the apparatus in the third mode responsive to a response from host to operate in the third mode, the third mode including providing host access to the non-volatile storage and the volatile memory.

An embodiment includes a method for operating a memory system. The method comprises initializing the memory system for operating in a Peripheral Component Interconnect Express protocol mode of operation following connection of the memory system by a Peripheral Component Interconnect Express interface of the memory system to a Peripheral Component Interconnect Express interface of a host. The method comprises sending a command from the memory system over the Peripheral Component Interconnect Express interface to the host while in the Peripheral Component Interconnect Express protocol mode of operation requesting whether the host selects to operate the memory system in a first mode in which the host has access only to volatile memory in the memory system, a second mode in which the host has access to only flash storage in the memory system, or a third mode in which the host has access to both the volatile memory and the flash storage in the memory system. The method comprises operating the memory system in the first mode responsive to the host selecting the first mode of operation.

An embodiment includes memory card comprising a physical communication interface configured to provide a physical interface to a host, a random access memory (RAM), a flash storage, means for negotiating with the host for a mode of operation of a plurality of modes that include a first mode in which the host has access to only the RAM and a second mode in which the host has access to at least the flash storage, means for operating the memory card in the first mode responsive to a response from host to operate in the first mode, and means for operating the memory card in the second mode responsive to a response from host to operate in the second mode.

In an embodiment, the means for negotiating with the host for a mode of operation of a plurality of modes that include a first mode in which the host has access to only the RAM and a second mode in which the host has access to at least the flash storage includes protocol manager 130, a processor, and/or an ASIC. In an embodiment, the means for negotiating with the host for a mode of operation of a plurality of modes that include a first mode in which the host has access to only the RAM and a second mode in which the host has access to at least the flash storage performs process 900.

In an embodiment, the means for operating the memory card in the first mode responsive to a response from host to operate in the first mode includes protocol manager 130, protocol converter 132, a processor, and/or an ASIC. In an embodiment, the means for operating the memory card in the first mode responsive to a response from host to operate in the first mode performs steps 816, 818 of process 800, and/or steps 1302-1322 of process 1300.

In an embodiment, the means for operating the memory card in the second mode responsive to a response from host to operate in the second mode includes protocol manager 130, storage controller 120, NVMe® controller 220, a processor, and/or an ASIC. In an embodiment, the means for operating the memory card in the second mode responsive to a response from host to operate in the second mode performs steps 820, 822 of process 800 and/or steps 1302, 1304, 1324, and 1326 of process 1300. Optionally the means for operating the memory card in the second mode responsive to a response from host to operate in the second mode performs steps 816, 818 of process 800, and/or steps 1302-1322 of process 1300.

In an embodiment, the means for negotiating with the host for a mode of operation of a plurality of modes that include a first mode in which the host has access to only the RAM and a second mode in which the host has access to at least the flash storage is configured to: initialize the memory card for operating in a Peripheral Component Interconnect Express protocol mode of operation following connection of the memory card by the physical communication interface of the host; and send a command over the physical communication interface to the host while in the Peripheral Component Interconnect Express protocol mode of operation requesting whether the host selects to operate the memory card in the first mode, the second mode, or a third mode in which the host has access to both the RAM and the flash storage.

In an embodiment, the means for operating the memory card in the second mode is configured to determine whether first packets of a Peripheral Component Interconnect Express protocol received from the host over the physical communication interface are a request to access the RAM or the flash storage. The means for operating the memory card in the second mode is further configured to, responsive to a determination that the first packets are a request to access the RAM: convert the first packets to second packets of a Double Date Rate (DDR) protocol; and send the second packets to the RAM to exchange data between the RAM and the host over the physical communication interface. The means for operating the memory card in the second mode is further configured to, responsive to a determination that the first packets are a request to access the flash storage, exchange data between the host and the flash storage over the physical communication interface using a Non-Volatile Memory Express protocol.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, if an element is referred to as being connected or coupled to another element, the element may be directly connected to the other element or indirectly connected to the other element via one or more intervening elements. If an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   a physical communication interface configured to provide a physical interface to a host;
   a volatile memory;
   a non-volatile storage; and
   one or more control circuits in communication with the physical communication interface, the non-volatile storage, and the volatile memory, wherein the one or more control circuits are configured, individually or in combination, to:
      send a command to the host requesting that the host select a mode of access from a plurality of modes that include a first mode in which the host has access to only the volatile memory and a second mode in which the host has access to at least the non-volatile storage;
      operate the apparatus in the first mode responsive to a response from the host to operate in the first mode, the first mode including providing the host access to the volatile memory but not to the non-volatile storage; and
      operate the apparatus in the second mode responsive to a response from the host to operate in the second mode, the second mode including providing the host access to the at least the non-volatile storage.

2. The apparatus of claim 1, wherein:
   the physical communication interface comprises a Peripheral Component Interconnect Express interface; and
   the one or more control circuits are further configured, individually or in combination, to exchange data between the host and the volatile memory in the first mode over the Peripheral Component Interconnect Express interface.

3. The apparatus of claim 2, wherein the one or more control circuits are further configured, individually or in combination, to exchange data between the host and the volatile memory in the first mode using Transaction Layer Protocol (TLP) packets over the Peripheral Component Interconnect Express interface.

4. The apparatus of claim 2, wherein the one or more control circuits are further configured, individually or in combination, to:
   communicate with the host over the Peripheral Component Interconnect Express interface using a Peripheral Component Interconnect Express protocol;
   communicate with the volatile memory over a Double Date Rate (DDR) interface using a DDR protocol; and
   convert between the Peripheral Component Interconnect Express protocol and the DDR protocol to exchange the data between the host and the volatile memory in the first mode over the Peripheral Component Interconnect Express interface.

5. The apparatus of claim 2, wherein:
   the non-volatile storage comprises flash storage; and
   the one or more control circuits are further configured, individually or in combination, to:
      determine whether a packet received over the Peripheral Component Interconnect Express interface in the second mode is a host request to access the volatile memory or the flash storage;
      exchange data between the host and the flash storage using a Non-Volatile Memory Express protocol over the Peripheral Component Interconnect Express interface in response to a determination that the packet contains a request to access the flash storage; and
      exchange data between the host and the volatile memory using a Peripheral Component Interconnect Express protocol over the Peripheral Component Interconnect Express interface in response to a determination that the packet contains a request to access the volatile memory.

6. The apparatus of claim 1, wherein the one or more control circuits are further configured, individually or in combination, to:
   receive first packets of a first protocol from the host over the physical communication interface;
   determine whether the first packets are a request to access the volatile memory or the non-volatile storage;
   responsive to a determination that the first packets are a request to access the volatile memory:
      convert the first packets to second packets of a second protocol; and
      send the second packets to the volatile memory to exchange data between the volatile memory and the host over the physical communication interface; and
   responsive to a determination that the first packets are a request to access the non-volatile storage:
      exchange data between the host and the non-volatile storage over the physical communication interface using a third protocol.

7. The apparatus of claim 1, wherein:
   the apparatus comprises a memory card; and
   the physical communication interface comprises contacts configured to be received by a memory card slot of the host.

8. The apparatus of claim 7, wherein the one or more control circuits are further configured, individually or in combination, to:
   negotiate with the host to operate the memory card in a memory card mode in which the host has access to the non-volatile storage but not to the volatile memory.

9. The apparatus of claim 8, wherein the memory card has a Secure Digital (SD) form factor configured to be received by the memory card slot of the host.

10. The apparatus of claim 7, wherein the one or more control circuits are further configured, individually or in combination, to send the command to the host requesting that the host select the mode of access following initialization of the memory card into a Peripheral Component Interconnect Express protocol mode in response to the memory card being inserted into the memory card slot of the host.

11. The apparatus of claim 1, wherein:
in the second mode the host has access the non-volatile storage but not the volatile memory;
the plurality of modes further includes a third mode in which the host has access to both the non-volatile storage and the volatile memory; and
the one or more control circuits are configured, individually or in combination, to operate the apparatus in the third mode responsive to a response from host to operate in the third mode, the third mode including providing host access to the non-volatile storage and the volatile memory.

12. A method for operating a memory system, the method comprising:
initializing the memory system for operating in a Peripheral Component Interconnect Express protocol mode of operation following connection of the memory system by a Peripheral Component Interconnect Express interface of the memory system to a Peripheral Component Interconnect Express interface of a host;
sending a command from the memory system over the Peripheral Component Interconnect Express interface to the host while in the Peripheral Component Interconnect Express protocol mode of operation requesting whether the host selects to operate the memory system in a first mode in which the host has access only to volatile memory in the memory system, a second mode in which the host has access to only flash storage in the memory system, or a third mode in which the host has access to both the volatile memory and the flash storage in the memory system; and
operating the memory system in the first mode responsive to the host selecting the first mode of operation.

13. The method of claim 12, wherein operating the memory system in the first mode responsive to the host selecting the first mode of operation comprises:
exchanging data between the host and the volatile memory in the first mode using Transaction Layer Protocol (TLP) packets over the Peripheral Component Interconnect Express interface.

14. The method of claim 12, wherein operating the memory system in the first mode responsive to the host selecting the first mode of operation comprises:
communicating with the host over the Peripheral Component Interconnect Express interface using a Peripheral Component Interconnect Express protocol;
communicating with the volatile memory over a Double Date Rate (DDR) interface using a DDR protocol; and
converting between the Peripheral Component Interconnect Express protocol and the DDR protocol to exchange data between the host and the volatile memory in the first mode over the Peripheral Component Interconnect Express interface.

15. The method of claim 12, further comprising:
receiving first packets of a Peripheral Component Interconnect Express protocol at the memory system over the Peripheral Component Interconnect Express interface from the host while in the first mode of operation;
converting the first packets to second packets of a Double Date Rate (DDR) protocol; and
sending the second packets to the volatile memory to exchange data between the volatile memory and the host over the Peripheral Component Interconnect Express interface.

16. The method of claim 12, wherein the host is a first host and further comprising:
initializing the memory system for operating in the Peripheral Component Interconnect Express protocol mode of operation following connection of the memory system by the Peripheral Component Interconnect Express interface to a second host;
sending a command from the memory system over the Peripheral Component Interconnect Express interface to the second host while in the Peripheral Component Interconnect Express protocol mode of operation requesting whether the host selects to operate the memory system in the first mode in which the second host has access to only the volatile memory in the memory system, the second mode in which the second host has access to only the flash storage in the memory system, or the third mode in which the second host has access to both the volatile memory and the flash storage in the memory system; and
operating the memory system in the second mode responsive to the second host selecting the second mode of operation.

17. The method of claim 16, further comprising:
initializing the memory system for operating in the Peripheral Component Interconnect Express protocol mode of operation following connection of the memory system by the Peripheral Component Interconnect Express interface to a third host;
sending a command from the memory system over the Peripheral Component Interconnect Express interface to the third host while in the Peripheral Component Interconnect Express protocol mode of operation requesting whether the host selects to operate the memory system in the first mode in which the third host has access to only the volatile memory in the memory system, the second mode in which the third host has access to only flash storage in the memory system, or the third mode in which the third host has access to both the volatile memory and the flash storage in the memory system; and
operating the memory system in the third mode responsive to the third host selecting the third mode of operation.

18. The method of claim 17, further comprising:
receiving first packets of a first protocol at the memory system over the Peripheral Component Interconnect Express interface from the third host;
determining whether the first packets are a request to access the volatile memory or the flash storage;
responsive to a determination that the first packets are a request to access the volatile memory:
converting the first packets to second packets of a second protocol; and
sending the second packets to the volatile memory to exchange data between the volatile memory and the third host over the Peripheral Component Interconnect Express interface; and
responsive to a determination that the first packets are a request to access the flash storage:
exchanging data between the third host and the flash storage over the Peripheral Component Interconnect Express interface using a Non-Volatile Memory Express protocol.

19. The method of claim 12, further comprising:
negotiating with the host to operate the memory system in a memory card mode in which the host has access to the flash storage but not to the volatile memory over a memory card interface of the memory system.

20. A memory card comprising:
a physical communication interface configured to provide a physical interface to a host;
a random access memory (RAM);
a flash storage;
means for negotiating with the host for a mode of operation of a plurality of modes that include a first mode in which the host has access to only the RAM and a second mode in which the host has access to at least the flash storage;
means for operating the memory card in the first mode responsive to a response from host to operate in the first mode; and
means for operating the memory card in the second mode responsive to a response from host to operate in the second mode.

* * * * *